US 6,736,908 B2

(12) United States Patent
Sako et al.

(10) Patent No.: US 6,736,908 B2
(45) Date of Patent: May 18, 2004

(54) COMPOSITION AND PROCESS FOR TREATING METAL SURFACES AND RESULTING ARTICLE

(75) Inventors: Ryosuke Sako, Kanagawa-Pref. (JP); Keiichi Ueno, Kanagawa-Pref. (JP); Takumi Honda, Kanagawa-Pref (JP)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/169,478

(22) PCT Filed: Dec. 22, 2000

(86) PCT No.: PCT/US00/35039

§ 371 (c)(1),
(2), (4) Date: Nov. 12, 2002

(87) PCT Pub. No.: WO01/48264

PCT Pub. Date: Jul. 5, 2001

(65) Prior Publication Data

US 2003/0213533 A1 Nov. 20, 2003

(30) Foreign Application Priority Data

Dec. 27, 1999 (JP) .......................................... H11-371035

(51) Int. Cl.$^7$ .................. C23C 22/00; C23C 22/05; C23C 22/40; C23C 26/00; C09D 5/08
(52) U.S. Cl. .................. 148/25; 106/14.05; 106/14.16; 106/14.41; 106/14.44; 148/247; 427/372.2; 427/388.1; 427/388.4; 428/457
(58) Field of Search .......................... 106/14.05, 14.16, 106/14.41, 14.42, 14.44; 148/247, 251; 427/372.2, 388.1, 388.4; 428/457

(56) References Cited

U.S. PATENT DOCUMENTS

| 4,963,596 | A | 10/1990 | Lindert et al. ............... 526/313 |
| 4,970,264 | A | 11/1990 | Lindert et al. ........... 525/328.8 |
| 5,039,770 | A | 8/1991 | Lindert et al. ............... 526/312 |
| 5,063,089 | A | 11/1991 | Lindert et al. ............... 427/354 |
| 5,116,912 | A | 5/1992 | Lindert et al. ............... 525/340 |
| 5,250,325 | A | 10/1993 | Phillips et al. ............... 427/386 |
| 5,266,410 | A | 11/1993 | Lindert et al. ............... 428/461 |
| 5,277,709 | A | 1/1994 | Armstrong et al. |
| 5,298,289 | A | 3/1994 | Lindert et al. ........... 427/388.4 |
| 5,449,415 | A | 9/1995 | Dolan ......................... 148/259 |
| 5,753,316 | A | 5/1998 | Brent et al. .................. 427/486 |
| 5,985,047 | A | 11/1999 | Buxton et al. ............... 148/247 |
| 6,361,872 | B1 | 3/2002 | Hosono et al. ............. 428/467 |
| 6,368,671 | B1 | 4/2002 | McCormick ................ 427/409 |

FOREIGN PATENT DOCUMENTS

| WO | WO 01/86016 A2 | * 11/2001 |
| WO | WO 01/92598 A1 | * 12/2001 |

* cited by examiner

*Primary Examiner*—Anthony J. Green
(74) *Attorney, Agent, or Firm*—Stephen D. Harper; Mary K. Cameron

(57) ABSTRACT

A metal treating composition comprising at least a specific type of dissolved and/or dispersed organic resin, a dissolved vanadium compound in which the valence of vanadium is from 3 to 5, and a dissolved compound that contains at least one of the metals Zr, Ti, Mo, W, Mn, and Ce can provide metal surfaces with superior corrosion resistance, alkali resistance, and fingerprint resistance. The composition contains no chromium to cause pollution problems and/or require pollution abatement.

19 Claims, No Drawings

COMPOSITION AND PROCESS FOR TREATING METAL SURFACES AND RESULTING ARTICLE

This application claims priority from International Application No. PCT/US00/35039, filed Dec. 22, 2000 and published in English under PCT Article 21(2), and Japanese Application No. H11-371035, filed Dec. 27, 1999, the entire disclosure of each application being incorporated herein by reference in its entirety.

FIELD AND BACKGROUND OF THE INVENTION

The present invention relates to: a chromium-free liquid metal surface treatment composition that forms, by spontaneous chemical reaction with a metal surface, a treatment coating with superior corrosion resistance, alkali resistance and fingerprint resistance; a metal surface treatment process that uses the treatment composition according to the invention; and articles of manufacture comprising metal surfaces treated by a process according to the invention. Suitable substrates for the invention include, but are not limited to, molded metal articles, cast metal articles, and metal sheet, coils, and the like that are used for automobile bodies, construction materials, household electrical appliances, and the like. Preferred metallic surfaces for treatment according to the invention are zinc- and zinc alloy-coated steel, uncoated (non-stainless) steel, and aluminum.

Metal surfaces such as these readily become corroded as a result of being oxidized by oxygen in the atmosphere, moisture, ions contained in moisture, etc. Conventional methods used to prevent such corrosion have included depositing a chromate coating film on the metal material by causing the surface of the metal material to contact a treatment solution containing chromium in the form of chromic acid, at least one chromate, etc. Such an inorganic chromate coating film alone exhibits short-term anti-corrosion properties in relatively mild environments but has insufficient long-term corrosion resistance and/or corrosion resistance in harsher environments. Furthermore, when sheets or coils treated with chromate alone are cut and/or molded, the molded coating film is usually hard and brittle and lacks facile slipping properties. As a result, not only can the coating film fall off so that the external appearance suffers, but sufficient working often can not be performed without generating cracks in the material. In addition, fingerprints of workers handling the metal adhere to its surface during working, and traces of these fingerprints remain even after degreasing and cleaning, so that there is a further adverse effect on the external appearance. Accordingly, in order to satisfy all performance requirements in terms of high corrosion resistance, fingerprint resistance, scratch resistance, slip properties, and paint adhesion, etc., a two-layer treatment is generally performed in which a chromate coating film is formed on the surface of the metal material, and a resin coating film is formed over the surface of this chromate coating film. Furthermore, in addition to being inadequate in terms of performance, a chromate coating film involves trouble and expense in terms of waste water disposal, since the treatment solution contains polluting hexavalent chromium. Moreover, since the formed coating film also contains hexavalent chromium, such chromate coating films tend to be avoided from the standpoints of safety and environmental considerations.

Resin chromates in which a chromate and a resin coating film are formed at one time have been investigated in an attempt to satisfy all performance requirements using a single-layer treatment. A treatment method in which the surfaces of aluminum-galvanized steel plates are coated with a resin composition containing a specified water-dispersible or water-soluble resin and a specified amount of hexavalent chromium is disclosed in Japanese Patent Application Kokoku No. 4-2672, and a metal surface treatment composition which contains hexavalent chromium ions or hexavalent chromium ions and trivalent chromium ions of an inorganic compound and an acrylic emulsion polymerized under specified emulsion polymerization conditions is disclosed in Japanese Patent Application Kokoku No. 7-6070. However, although the amounts of hexavalent chromium contained in these coating films is small, this hexavalent chromium is gradually eluted from the coating films, so that there are problems in terms of environmental and safety considerations as described above.

In regard to methods which use a treatment solution that contains no chromium: A polymer composition used for the surface treatment of metal materials which contains a phenol resin type polymer with a specified structure and an acidic compound, and a surface treatment method using this composition, are disclosed in Japanese Patent Application Kokai No. 7-278410; a metal surface treatment agent which contains two or more types of silane coupling agents that have reactive functional groups with specified structure capable of reacting with each other and with other types of groups, and which is superior in terms of fingerprint resistance, etc., and a treatment method using this metal surface treatment agent, are disclosed in Japanese Patent Application Kokai No. 8-73775; a metal surface treatment agent which contains a silane coupling agent that has a specified structure and a phenol resin type polymer that has a specified structure, and a treatment method using this metal surface treatment agent, are disclosed in Japanese Patent Application Kokai No. 9-241576; a metal surface treatment agent which contains a specified polyvalent anion and an organic polymer such as an epoxy resin, acrylic resin or urethane resin, etc., that has at least one nitrogen atom per molecule, a treatment method using this metal surface treatment agent and a treated metal material are disclosed in Japanese Patent Application Kokai No. 10-1789; and (i) an anti-rust agent which contains a bisphenol A epoxy type resin with a specified structure, and (ii) an anti-rust agent which contains a phenol type resin and another specified resin such as a polyester, etc., at a specified ratio, as well as a treatment method using (i) and (ii), and a treated metal material, are disclosed in Japanese Patent Application Kokai No. 10-60233.

However, although metal surface treatments that do not use chromium are advantageous in that the treatment solution contains no hexavalent chromium, the corrosion resistance produced by such treatments is often insufficient, and in particular, the corrosion resistance obtained in scratched parts and worked parts is conspicuously inferior to that afforded by chromate coating films. Moreover, the fingerprint resistance, scratching resistance and slip properties usually are also insufficient.

At the present time, therefore, no non-chromate type metal surface treatment agent capable of forming a coating film that simultaneously endows the surfaces of metal materials with superior corrosion resistance, alkali resistance and fingerprint resistance has yet been obtained, insofar as the applicants are aware.

The major object of this invention is to provide a metal surface treatment composition that does not contain chromium and endows metal materials with at least one of corrosion resistance, alkali resistance, and fingerprint resistance that are superior to those obtained by prior art chromate-free compositions, along with a process for using this metal surface treatment composition and with articles of manufacture resulting therefrom.

BRIEF SUMMARY OF THE INVENTION

It has been found that a coating film which has superior corrosion resistance, alkali resistance and fingerprint resistance can be obtained by treating the surface of a metal material with a metal surface treatment composition that contains a resin with a specified structure, a vanadium compound, and a specified metal compound as essential components.

DETAILED DESCRIPTION OF THE INVENTION AND PREFERRED EMBODIMENTS

Specifically, a metal surface treatment composition of the present invention comprises, preferably consists essentially of, or more preferably consists of water and the following components:

(A) a component of resin molecules that conform to general formula (I):

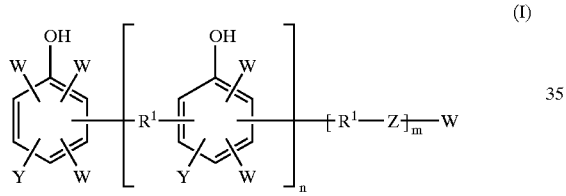

wherein:
n represents 0 or an integer from 1 through 29, preferably is at least 1 and independently preferably is not more than, with increasing preference in the order given, 25, 20, 15, 10, or 8;
m represents 0 or an integer from 1 through 10 and preferably is not more than, with increasing preference in the order given, 8, 6, or 5;
W represents a moiety selected from the group consisting of:
(1) a hydrogen atom moiety; and
(2) moieties conforming to one of the general formulas —$CH_2X$, —$CH_2NHCH_2X$, and —$CH=NCH_2X$, in all of which "X" represents a moiety selected from the group consisting of:
—OH;
moieties conforming to —$OR^4$, wherein $R^4$ is selected from the group consisting of alkyl moieties having from 1 to 5 carbon atoms and hydroxyalkyl moieties having from 1 to 5 carbon atoms;
covalently bonded halogen atom moieties; and
moities conforming to one of general formula (III) or general formula (IV):

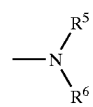

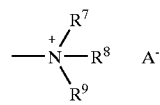

wherein:
each of $R^5$, $R^6$, $R^7$, $R^8$, and $R^9$ independently represents a moiety selected from the group consisting of:
hydrogen atom moieties;
alkyl moieties having from 1 to 10 carbon atoms; and
hydroxyalkyl moieties having from 1 to 10 carbon atoms; and
$A^-$ represents a hydroxyl ion or an anion of an acid;
each "W" symbol in general formula (I) is independently selected, subject to constraints that:
a positive number of the selections for "W" are not hydrogen atom moieties; and
said positive number of the selections for "W" that are not hydrogen atom moieties has a ratio to the number n+m+1, this ratio being denoted hereinafter as the "P-ratio", that is at least, with increasing preference in the order given, 0.2:1.00, 0.4:1.00, or 0.6:1.00 and independently preferably is not more than, with increasing preference in the order given, 4.0:1.00, 3.5:1.00, 3.0:1.00, or 2.5:1.00;
$R^1$, independently for each of the n+m units shown between a pair of square brackets in formula (I), represents a moiety selected from the group consisting of —$CH_2$—, —$CH_2$—NH—$CH_2$—, and —CH=N—$CH_2$—;
Y, independently for each of the n+1 instances of the symbol in the general formula, represents a hydrogen moiety or a moiety that conforms to general formula (II):

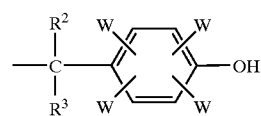

wherein each of $R^2$ and $R^3$ independently represents a hydrogen atom or an alkyl group with not more than 3 carbon atoms and W, independently for each instance of its occurrence in formula (II), is selected from the group consisting of:
(1) a hydrogen atom moiety; and
(2) moieties conforming to one of the general formulas —$CH_2X$, —$CH_2NHCH_2X$, and —CH=$NCH_2X$, in all of which "X" represents a moiety selected from the group consisting of:
—OH;
moieties conforming to —$OR^4$, wherein $R^4$ is selected from the group consisting of alkyl moieties having from 1 to 5 carbon atoms and hydroxyalkyl moieties having from 1 to 5 carbon atoms;

covalently bonded halogen atom moieties; and moities conforming to one of general formula (III) or general formula (IV):

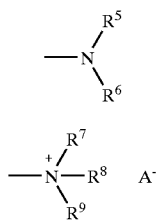

wherein:
each of $R^5$, $R^6$, $R^7$, $R^8$, and $R^9$ independently represents a moiety selected from the group consisting of:
hydrogen atom moieties;
alkyl moieties having from 1 to 10 carbon atoms; and
hydroxyalkyl moieties having from 1 to 10 carbon atoms; and
$A^-$ represents a hydroxyl ion or an anion of an acid;
Z is selected from the group consisting of
(1) divalent moieties which:
can be formed by the loss, from an organic compound that is capable of addition condensation with formaldehyde and that contains at least one 5- or 6-membered ring that includes two conjugated double bonds, of two hydrogen atoms, each originally bonded to a carbon atom that was part of said 5- or 6-membered ring; and
differ from the aromatic-ring-containing moiety in the part of formula (I) between the square brackets subscripted by "n"; and
(2) divalent moieties that can be formed by the loss of one hydrogen atom from each of two distinct amino moieties of melamine, guanamine, and urea; and
(B) a component selected from the group consisting of vanadium compounds in which the valence of the vanadium atoms is 5, 4, or 3; and
(C) a component selected from the group consisting of compounds that contain at least one metal selected from the group consisting of zirconium, titanium, molybdenum, tungsten, manganese, and cerium.

It is preferred, in order to maintain a high corrosion resistance and alkali resistance in the coating film formed from the treatment agent of the present invention, that at least some of the vanadium compounds in component (B) of the metal surface treatment composition of the present invention consist of a vanadium compound whose oxidation number is 3 or 4.

It is independently preferred, in order to further heighten the corrosion resistance, fingerprint resistance and workability, that the metal surface treatment composition of the present invention additionally comprise a component (D) that is selected from the group consisting of organic polymers that
do not conform to general formula (I);
have a weight average molecular weight that is from 1,000 to 1,000,000; and
are dispersed or dissolved in the metal treatment composition.

Furthermore, in order to further facilitate the formation of a uniform coating film by improving the stability of the vanadium compound(s) in the treatment solution of the present invention, it is independently preferred that the metal surface treatment composition of the present invention additionally comprise an additional component (E) selected from the group consisting of water-soluble organic compounds that are not part of any of components (A) through (D) and contain in each molecule at least one moiety selected from the group consisting of hydroxy moieties, carbonyl moieties, carboxyl moieties, phosphoric acid moieties, phosphonic acid moieties, primary, secondary, and tertiary amino moieties, and amido moieties.

Still further, in order to increase the adhesion of the coating film produced on a metal surface by a treatment composition according to this invention, it is preferred that a metal surface treatment composition of the present invention additionally comprise a component (F) that is selected from the group consisting of water soluble fluorides and complex fluorides.

Furthermore, a pH-adjusting acidic or alkaline component (G) may be included in a surface treatment composition according to the invention, in order to increase the solubility or dispersibility of the resin component (A) in the metal surface treatment composition. Examples of suitable acids and alkalis include phosphoric acid, hydrochloric acid, sulfuric acid, nitric acid, formic acid, acetic acid, sodium hydroxide, potassium hydroxide, ammonia, and primary, secondary, and tertiary amines. The pH value in a working surface treatment composition according to the invention preferably is from 1.0 to 11, or more preferably from 2.0 to 10.0.

Another embodiment of the present invention is a process for treating a metallic surface treatment, in which the metallic surface is brought into contact for at least one time interval with a treatment composition according to the invention so as to form a coating of said liquid composition over said metallic surface and said coating of said liquid composition is dried into place over and adhering to said metallic surface.

Still another embodiment of the invention is an article of manufacture comprising an underlying metallic surface covered with a coating film formed by such a process according to the invention.

In regard to the resin component (A) contained in a metal surface treatment composition of the present invention, examples of alkyl moieties with 1 to 3 carbon atoms indicated by $R^2$ and $R^3$ in the definition of Y in general formula (I) include methyl moieties, ethyl moieties, propyl moieties and isopropyl moieties.

Examples of 5- or 6-membered ring compounds capable of addition polymerization with formaldehyde are phenolsulfonic acid, alkylene glycol phenol ethers, β-naphthol, naphthalenesulfonic acid, toluene, xylene, aniline, acetoanilide, thiophenol, thiophene, fufural, and furfuryl alcohol.

Examples of alkyl moieties with 1 to 5 carbon atoms indicated by $R^4$ in the definition of X within the definition of W in general formula (I) include methyl moieties, ethyl moieties, propyl moieties, isopropyl moieties, butyl moieties, isobutyl moieties, pentyl moieties, and isopentyl moieties. Examples of hydroxyalkyl moieties with 1 to 5 carbon atoms include hydroxymethyl moieties, 2-hydroxyethyl moieties, 1-hydroxyethyl moieties, 3-hydroxypropyl moieties, 4-hydroxybutyl moieties, and 5-hydroxypentyl moieties.

Examples of halogen atoms in the definition of X within the definition of W in general formula (I) include chlorine atoms, bromine atoms, iodine atoms and fluorine atoms.

Examples of alkyl moieties with 1 to 10 carbon atoms in the definition of X within the definition of W in general formula (I) include methyl moieties, ethyl moieties, propyl moieties, isopropyl moieties, butyl moieties, isobutyl moieties, pentyl moieties, hexyl moieties, heptyl moieties, octyl moieties, nonyl moieties, and decyl moieties. Examples of hydroxyalkyl moieties with 1 to 10 carbon atoms include hydroxymethyl moieties, 2-hydroxyethyl moieties, 1-hydroxyethyl moieties, 3-hydroxypropyl moieties, 4-hydroxybutyl moieties, 5-hydroxypentyl moieties, 6-hydroxyhexyl moieties, 7-hydroxyheptyl moieties, 8-hydroxyoctyl moieties, 9-hydroxynonyl moieties, and 10-hydroxydecyl moieties.

Examples of anions of acids indicated by $A^-$ in the definition of X within the definition of W in general formula (I) include inorganic anions such as halide anions (chloride, bromide, fluoride, etc.), sulfate ions, nitrate ions, and phosphate ions, and organic anions such as acetate anions and formate anions.

With respect to the repeating units between pairs of square brackets subscripted by n and m, the resin expressed by general formula (I) may have a block structure, an alternately bonded structure, or a randomly bonded structure.

If the number of carbon atoms of the alkyl moieties indicated by $R^2$ and $R^3$ in the definition of Y in general formula (I) exceeds 3, the hydrophobicity usually will be excessively high. If the P-ratio is outside the range from 0.2 to 4.0, sufficient corrosion resistance and/or alkali resistance are often not obtained. If the number of carbon atoms in the alkyl moieties or hydroxyalkyl moieties indicated by $R^4$ in the definition of group X exceeds 5, the stability of the treatment agent drops. Similarly, if the number of carbon atoms in the alkyl moieties or hydroxyalkyl moieties indicated by $R^5$ through $R^6$ in general formulas (III) and (IV) exceeds 10, the stability of the treatment agent drops. Moreover, if n exceeds 29, the viscosity may be impractically high, and the stability of the resin component (A) in the treatment agent drops.

Resins with molecules that conform to general formula (I) are known per se and/or can easily be manufactured by a person skilled in the art. Specifically, such a resin can be obtained by the addition condensation of one or more phenol or bisphenol type compounds and/or compounds containing moiety "Z" with a source of formaldehyde.

Examples of suitable vanadium compounds for component (B) are: $V_2O_5$, $HVO_3$ and its ammonium and sodium salts, and $VOCl_3$, in all of which vanadium has a valence of 5; and compounds in which the vanadium valence 3 or 4, e.g., $V_2O_3$, $VO_2$, $VOSO_4$, vanadium oxyacetylacetonate, vanadium acetylacetonate, vanadium trichloride, and $H_{15-x}[PV_{12-x}Mo_xO_{40}] \cdot nH_2O$ (6<x<12, n<30).

In order to achieve high corrosion resistance and alkali resistance of the coating film that is formed, a treatment agent according to the invention preferably contains a vanadium compound with a valence of 3 or 4 as the aforementioned vanadium component (b). Specifically, the proportion of vanadium compound(s) with a valence of 3 or 4 in the vanadium component (b), i.e., $(V^{3+}+V^{4+})/V$, wherein $V^{3+}$, $V^{4+}$ and V respectively indicate the mass of vanadium with a valence of 3, the mass of vanadium with a valence of 4, and the mass of the total vanadium, preferably is from 0.1 to 1.0, more preferably is from 0.2 to 1.0, and still more preferably is from 0.4 to 1.0.

Examples of means which can be used to include trivalent or tetravalent vanadium compounds in the present treatment agent include using trivalent or tetravalent vanadium compounds as described above, as well as methods in which pentavalent vanadium compounds are reduced to trivalent or tetravalent vanadium compounds by means of a reducing agent. The reducing agent used may be either inorganic or organic; however, organic agents are preferred, and the use of at least part of the material added to constitute optional component (E) is especially preferred, for this purpose.

Optional water-soluble organic compound component (E) that is added to the metal surface treatment composition of the present invention if desired may be exemplified by: alcohols such as methanol, ethanol, isopropanol and ethylene glycol, etc.; aldehyde compounds such as formaldehyde, acetaldehyde, and furfural; carbonyl compounds such as acetylacetone, ethyl acetoacetate, dipivaloylmethane, and 3-methylpentanedione; organic acids such as formic acid, acetic acid, propionic acid, tartaric acid, ascorbic acid, gluconic acid, citric acid, and malic acid; amine compounds such as triethylamine, triethanolamine, ethylenediamine, pyridine, imidazole, pyrrole, morpholine, and piperazine; acid amide compounds such as formamide, acetamide, propionamide, and N-methylpropionamide; amino acids such as glycine, alanine, proline, and glutamic acid; monosaccharides such as glucose, mannose, and galactose; natural polysaccharides such as malt sugar, cane sugar, cellulose, and starch; organophosphoric acids such as aminotri(methylenephosphonic acid), 1-hydroxyethylidene-1,1'-diphosphonic acid, ethylenediaminetetra(methylenephosphonic acid), and phytic acid; natural macromolecules such as gallic acid, tannic acid, humic acid, ligninsulfonic acid, and polyphenols; synthetic macromolecules such as polyvinyl alcohols, polyethylene glycols, polyacrylic acids, polyacrylamides, polyethyleneimines, and water-soluble nylons; and aminocarboxylic acids such as ethylene diamine tetraacetic acid.

Such water-soluble organic compounds of optional component (E) not only act to reduce pentavalent vanadium compound(s), but also conspicuously improve the stability of the vanadium compound(s) in the treatment solution, so that the superior corrosion resistance imparting effect of the treatment agent of the present invention can be maintained for a long period of time. Furthermore, since the films formed with a treatment solution containing component (E) are more uniform, the level of corrosion resistance of a product according to the invention can also be increased.

The water-soluble organic component (E) has an effect as long as its compound(s) have any of the aforementioned functional moieties; however, it is more desirable if the compound(s) have two or more such functional moieties per molecule.

Component (E) may be introduced into a treatment agent according to the invention by simply mixing in one or more appropriate sources of component (E) along with the other components in any order. However, it is preferred, whenever component (E) is used, to mix components (E) and (B) with water, in the absence of any other components of a treatment composition according to the invention, and to heat the resulting mixture, e.g., for 5 to 120 minutes at 40 to 100° C., to form a precursor mixture. This precursor mixture, which may well contain complexes or other products of reaction between the substances added to supply components (E) and (B), is then used to supply both components (E) and (B) to a final treatment solution according to the invention. The stabilizing effect of component (E) on the vanadium compounds of component (B) is maximized by this method, and any desired reduction of pentavalent vanadium compounds originally included in component (B) to more desirable tri- or tetra-valent vanadium compounds in the final solution is more reliably achieved.

The metal compound(s) of component (C) are exemplified by oxides, hydroxides, complex compounds, and salts with inorganic acids and organic acids of the metals above mentioned for component (C). It is desirable that the compound(s) used have good compatibility with resin component (A). Specific examples of such metal compounds include zirconyl nitrate $ZrO(NO_3)_2$, zirconyl sulfate, zirconyl ammonium carbonate, titanyl sulfate, diisopropoxytitanium bisacetylacetone, reaction products of lactic acid and titanium alkoxides, basic titanium lactate, molybdic acid, ammonium molybdate, sodium molybdate, molybdophosphoric acid compounds such as $(NH_4)_3[PO_4Mo_{12}O_{36}] \cdot 3H_2O$, $Na_3[PO_4 \cdot 12\ MoO_3] \cdot nH_2O$, $H_2W_{12}O_{40}]$, $(NH_4)_6[H_2W_{12}O_{40}]$, sodium meta-tungstate, $H_{10}[W_{12}O_{46}H_{10}]$, ammonium para-tungstate, sodium para-tungstate, $HMnO_4$, potassium permanganate, sodium permanganate, manganese dihydrogen phosphate, manganese nitrate, manganese (II), (III) or (IV) sulfate, manganese (II) or (III) fluoride, manganese carbonate, manganese (II) or (III) acetate, cerium acetate $Ce(CH_3CO_2)_3$, cerium (III) or (IV) nitrate, cerium chloride, and the like. Molybdenum (VI) compounds, tungsten (VI) compounds, and manganese (VI) compounds that have been reduced in metal valence by a reducing agent such as an alcohol, organic acid, or the like, may also be used.

When optional component (D) is present in a treatment solution according to this invention, the weight average molecular weight of the organic polymer molecules in this component preferably is from 1,000 to 1,000,000 and more preferably is from 2,000 to 500,000. If the molecular weight is less than 1,000, the coating film forming benefits expected from the presence of component (D) are usually not obtained; on the other hand, if the molecular weight exceeds 1,000,000, the stability of the treatment agent is reduced. There are no narrow restrictions on the organic polymers that are used, so long as these organic polymers: can be mixed with the treatment agent; can be dissolved in water or dispersed in the form of an emulsion or dispersion, optionally in the presence of an emulsifying agent; remain uniformly dissolved and/or dispersed and are stable in the treatment agent; and can be diluted with water. There are no narrow restrictions on emulsifying agents that can be used to disperse the polymers; examples of suitable emulsifying agents include anionic surfactants such as alkylsulfates and the like, cationic surfactants such as alkyl quaternary ammonium salts and the like, nonionic surfactants such as alkylphenyl ethers and the like, and water-soluble polymers.

Examples of suitable organic polymers for optional component (D) include:

acrylic resins such as homopolymers and copolymers of acrylic monomers such as alkyl ($C_1$–$C_8$) esters of (meth)acrylic acid (such as methyl acrylate, methyl methacrylate, ethyl acrylate, ethyl methacrylate, propyl acrylate, butyl acrylate, 2-ethylhexyl methacrylate, octyl acrylate); hydroxyalkyl ($C_1$–$C_4$) esters of (meth) acrylic acid (such as 2-hydroxyethyl (meth)acrylate, 3-hydroxypropyl (meth)acrylate, etc.) and (meth) acrylic acid; and copolymers of such acrylic monomers (constituting 30 wt % or more of the copolymer) with addition-polymerizable unsaturated monomers such as styrene, acrylonitrile or vinyl acetate;

polyolefin type resins such as homopolymers or copolymers of olefins ($C_1$–$C_8$) (such as ethylene, propylene, butene, hexene, octene) and copolymers of such olefins (constituting 50 wt % or more of the copolymer) with (meth)acrylic acid;

urethane resins, which are condensation products of polyols such as:

alkylene ($C_1$–$C_6$) glycols (e.g., ethylene glycol, propylene glycol, butylene glycol, neopentyl glycol, hexamethylene glycol), polyether polyols (e.g., polyethylene glycols such as diethylene glycol, triethylene glycol, and polyethylene/polypropylene glycols), polyester polyols (e.g., polyester polyols with terminal hydroxy moieties obtained by the polycondensation of polyols such as the abovementioned alkylene glycols or polyether polyols, or bisphenol A, hydrogenated bisphenol A, trimethylolpropane or glycerol, etc., with polybasic acids such as succinic acid, glutaric acid, adipic acid, sebacic acid, phthalic acid, isophthalic acid, terephthalic acid or trimellitic acid), and polycarbonate polyols, with aromatic alicyclic or aliphatic polyisocyanates (such as tolylene diisocyanate, diphenylmethane diisocyanate, xylylene diisocyanate, dicyclohexylmethane diisocyanate, cyclohexylene diisocyanate, hexamethylene diisocyanate, and lysine diisocyanate);

epoxy resins such as: bisphenol type epoxy resins obtained by reacting bisphenols, especially bisphenol A, with epichlorohydrin; novolak type epoxy resins obtained by glycidyl etherification of the phenolic hydroxy moieties of phenol novolak resins; glycidyl esters of aromatic carboxylic acids; and peracid epoxy type epoxy resins obtained by epoxidation of the double bonds of ethylenic unsaturated compounds with peracids; and polyester resins which are condensation products of polyol components such as ethylene glycol or neopentyl glycol and polybasic acids and their anhydrides such as terephthalic acid and trimellitic anhydride.

Among the abovementioned organic polymers, soap-free polymers that do not use surfactants as solubilizers or emulsifying/dispersing agents, or polymers in which the amounts of such surfactants used are minimized, are more desirable. In the case of acrylic resins, resins that are solubilized or self-emulsified by the copolymerization of monomers that have at least one unsaturated carbon-carbon double bond and at least one hydrophilic group selected from the group consisting of anionic hydrophilic moieties such as sulfonic acid moieties, phosphoric acid moieties, phosphonic acid moieties and carboxyl moieties, cationic hydrophilic moieties such as primary to tertiary amino moieties and quaternary ammonium moieties, and nonionic hydrophilic moieties such as hydroxy moieties, polyoxyethylene chains and amido moieties are more desirable.

In regard to polyolefin type resins, monomers with the aforementioned hydrophilic moieties are used as copolymerizable components. In the case of urethane resins, resins in which one of the polyol components has hydrophilic moieties that do not react during polymerization may be used to obtain a soap-free dispersion. In the case of epoxy resins, hydrophilic moieties may be introduced by modifying some or all of the glycidyl ether. In the case of polyester resins, a water-soluble, self-emulsifying resin can be obtained by a method using a polybasic acid that has the aforementioned hydrophilic moieties as a portion of the polybasic acid that is used.

The one or more fluorine compounds selected from the group consisting of hydrofluoric acid, metal fluorides, and complex metal fluorides that constitute component (F) when it is used in the surface treatment composition of the present invention provide fluorine-containing anions that are liberated in the aqueous solution. Examples of suitable compounds include hydrofluoric acid, fluoroboric acid, fluorosilicic acid, flurozirconic acid, fluorotitanic acid, tin fluoride, ferrous fluoride, and ferric fluoride.

The amounts of the respective components in the treatment agent of the present invention are noted below for an instance in which the total of the resin component (A) (solids content), the vanadium contained in the vanadium component (B), the metal(s) from the specified group contained in the metal compound component (C), the organic polymer component (D) (solids content), and the water-soluble organic compound component (E) is 100 parts by mass. With such a total, independently for each component:

the parts of resin solids in component (A) preferably are at least, with increasing preference in the order given, 3, 5, 7, or 9 and independently preferably are not more than, with increasing preference in the order given, 99, 95, 90, 85, 80, or 75;

the part(s) of vanadium in component (B) preferably is at least, with increasing preference in the order given, 0.05, 0.10, 0.20, 0.30, 0.40, 0.50, 0.60, 0.70, 0.80, 0.90, or 0.95 and independently preferably is not more than, with increasing preference in the order given, 30, 20, 17, 14, 12, or 10;

the total part(s) of the specified metal(s) in component (C) preferably is at least, with increasing preference in the order given, 0.05, 0.10, 0.30, 0.50, 0.70, 0.90, 1.10, 1.30, 1.50, 1.70, or 1.90 and independently preferably is not more than, with increasing preference in the order given, 30, 20, 17, 15, 13, or 11; and the parts of organic polymer solids in component (D) when present preferably are at least, with increasing preference in the order given, 5, 10, 12, 14, 16, 18, or 20 and independently preferably are not more than, with increasing preference in the order given, 95, 90, 85, or 80.

In regard to the resin component (A), vanadium compound component (B), metal compound component (C) and organic polymer component (D), the abovementioned preferred values (and ranges that can be defined by pairing two of the preferred values) are preferred in order to maintain a high corrosion resistance.

In order to maintain the stability of the vanadium component (B) in the treatment solution, the mass of the water-soluble organic compounds of component (E) when used preferably is at least, with increasing preference in the order given, 5, 10, 12, 14, 16, 18, or 20% by mass of the vanadium in component (B) and independently preferably is not more than, with increasing preference in the order given, 400, 300, 250, 200, 150, or 100% by mass of the vanadium in component (B).

The concentration of the fluorine compound component (F) when used that is contained in the treatment agent preferably is at least 0.05, 0.1, 0.3, 0.5, 0.7, or 0.9 grams per liter, hereinafter usually abbreviated as "g/l", and independently preferably is not more than, with increasing preference in the order given, 30, 20, 15, 10, 7, or 5 g/l. If the amount of component (F) is less than 0.05 g/l, the reaction with the metal substrate surface may be insufficient, while if this amount exceeds 30 g/l, the adhesion achieved may be inadequate.

In the treatment agent of the present invention, it is effective to add a water-dispersible silica sol and/or a metal oxide sol such as an alumina sol or zirconia sol or the like, in order to improve the corrosion resistance of the coating film, and in order to adjust physical properties of the coating film such as the tensile strength, etc. When such a sol is added, its amount preferably is from 5 to 40, or more preferably from 10 to 30, parts by mass when combined with 100 parts by mass of the total of components (A) through (E) as described in detail above.

Furthermore, in the treatment agent of the present invention, it is effective to include at least one wax selected from the group consisting of water-dispersed waxes (such as polyolefin waxes, ester waxes, and hydrocarbon waxes) in order to improve the slip properties and mechanical workability of the coating film. When combined with 100 parts by mass of the total of components (A) through (E) as described in detail above, the amount if any of such wax used preferably is from 0.5 to 30 parts by mass and more preferably is from 1 to 20 parts by mass.

Additionally, organic crosslinking agents or inorganic crosslinking agents that are capable of crosslinking the molecules of organic polymer component (D) may be added to a surface treatment composition of the present invention. Examples of organic crosslinking agents that can be used include epoxy type, melamine type, aldehyde type and isocyanate type crosslinking agents. Examples of inorganic crosslinking agents that can be used include compounds of metals other than the metals specified as part of one of components (A) through (F) in the present invention, such as iron, cobalt, nickel, niobium, tantalum, and zinc.

Water is the preponderant solvent used in the surface treatment composition of the present invention; however, water-soluble organic solvents such as alcohols, ketones and CELLOSOLVE type solvents may be used if needed in combination with water in order to avoid cracking or other non-uniformities of the coating that develop during drying.

In addition, surfactants, defoaming agents, leveling agents, anti-fungal/anti-mold agents and coloring agents, etc., may be added in amounts that have no adverse effect on the coating process and/or the performance of the coating film.

Ordinarily, a roll coating method in which the treatment agent is applied to the surface of the material by a roll transfer process, a method in which the treatment agent is caused to flow liberally onto the material and then reduced to the desired thickness by means of rolls or using an air knife, a method in which the material is dipped in the treatment solution, or a method in which the treatment agent is sprayed onto the material, will be used. There are no narrow restrictions on the temperature of the treatment solution; however, since water is the preponderant solvent used for this treatment agent, a treatment temperature of 0 to 60° C. is preferred, and a temperature of 5 to 40° C. is more preferred.

Furthermore, the pretreatment process is not narrowly restricted; ordinarily, however, the material is cleaned with an alkali degreasing agent or an acidic degreasing agent, or is washed with hot water or cleaned with a solvent, etc., in order to remove oily components and contaminants adhering to the material before the present treatment is performed. Afterward, a surface pH adjustment is performed by means of an acid or alkali if necessary. In the cleaning of the surface of the material, it is desirable that this surface be washed with water following cleaning so that the cleaning agent is prevented (as far as possible) from remaining on the surface of the material. The treatment agent of the present invention may be applied directly following the cleaning of the surface of the base-material metal; however, it is also possible to apply the treatment agent of the present invention after a phosphate formation treatment has been performed.

In cases where adhering water is merely removed without any need to accelerate the curing of the organic polymer (d), the drying operation in a process according to the invention does not necessarily require heat; instead, a physical process such as air draft drying or air blowing, etc., may be used. However, drying by heating may be practically necessary in order to accelerate the curing of the organic polymers in component (D), or in order to increase the uniforming of the covering by softening its constituents to allow them to flow over any initially uncoated small areas. The temperature in this instance is preferably is from 50 to 250° C. and even more preferably is from 60 to 220° C.

The mass per unit area of adhering coating film that is formed in a process according to the invention preferably is from 0.030 to 5.0 grams of coating per square meter of metallic surface coated, this unit being hereinafter usually abbreviated as "g/m²", and more preferably is from 0.050 to 3.0 g/m². If this amount is less than 0.030 g/m², sufficient corrosion resistance and adhesion to the overcoat often can not be obtained. On the other hand, if this amount exceeds 5.0 g/m², cracks or other discontinuities are more likely to occur in the coating film, so that the adhesion of the coating film itself drops.

It is believed that a surface treatment composition of the present invention reacts with a metallic substrate surface while being applied to the surface and dried. It is further believed that, when organic polymer component (D) is present in a treatment solution according to this invention, at least part of component (D) is at least partially enriched in the outer surface of the coating film formed, so that this coating film has a two-layer structure.

Next, the present invention will be described in terms of working examples and comparative examples; however, these working examples do not limit the present invention. Characteristics of the working examples and comparative examples were as follows:

1. Substrates 1.1: Electrogalvanized steel plates (plate thickness: 0.8 millimeter, this unit being hereinafter usually abbreviated as "mm")

1.2: Melt-galvanized steel plates (plate thickness: 0.8 mm)

1.3: 55% aluminum-galvanized steel plates (plate thickness: 0.5 mm)

2. Treatment Solutions

The resin compounds conforming to general formula (I) that were used in the working examples are as shown in Table 1 below. The circled numerals in Table 1 are keys to the actual meaning for the particular resins of the moieties described in a generalized manner for general formula (I), as given below. When there is more than one circled numeral in a particular cell, the resin on the corresponding line had as many different kinds of moieties of the type shown in the column heading as there are circled numerals in the cell. A number in parentheses to the right of each circled numeral except "1" in the column headed "W" indicates the ratio of the number of moieties of the particular chemical structure keyed by the circled numeral to the immediate left to the total number of benzene rings and moieties "Z" in all of the resin molecules collectively, and the balance of all of the "W" moieties was —H, keyed by ①. A number in parentheses to the right of each circled numeral except "1" in the column headed "Y" indicates the ratio of the number of moieties of the particular chemical structure keyed by the circled numeral to the immediate left to the total number of benzene rings in all of the resin molecules collectively, and the balance of all of the "Y" moieties was —H, keyed by ①.

TABLE 1

| Resin Identifier | Meaning, in General Formula (I) for Resin Identified at Left, for: | | | | | |
|---|---|---|---|---|---|---|
| | $R^1$ | W | Y | Z | n | m |
| a1 | ① | ① ②(2.0) | ① | None | 1 | 0 |
| a2 | ① | ① ②(2.0) ③(0.5) | ① | None | 2 | 0 |
| a3 | ① ② | ① ②(0.2) ⑦(1.0) | ① | None | 10 | 0 |
| a4 | ① | ① ②(0.2) ④(0.2) ⑤(0.4) | ① ②(0.5) | None | 5 | 0 |
| a5 | ① | ① ⑤(0.5) | ②(1.0) | None | 15 | 0 |
| a6 | ① ② | ① ③(0.4) ⑦(1.0) | ① | None | 10 | 0 |
| a7 | ① | ① ⑥(0.6) | ① ②(0.2) | None | 20 | 0 |
| a8 | ① ② | ① ②(0.1) ⑧(2.0) | ① | ① | 5 | 1 |
| a9 | ① | ① ⑥(0.8) | ① ②(0.3) | ② | 8 | 5 |

The circled numerals have the following meanings for the respective moieties in Table 1:
$R^1$: ① = —$CH_2$— ② = —$CH_2$—NH—$CH_2$—
W: ① = —H ② = —$CH_2OH$ ③ = —$CH_2OCH_3$ ④ = —$CH_2Br$
⑤ = —$CH_2N(CH_3)(CH_2CH_2OH)$ ⑥ = —$CH_2N(CH_2CH_2OH)_2$
⑦ = —$CH_2NH_2$ ⑧ = —$CH_2N^+ (CH_3)_3 \cdot OH^-$
① = —H
② = General formula (II), with each of $R^2$ and $R^3$ representing —$CH_3$ and the "W" moieties of general formula (II) being distributed jointly with the "W" moieties explicitly shown in general formula (I) to give the ratio (s) shown in the cell on the same line under the column heading "W".
Z: A moiety derived by deleting two hydrogen atoms from hydrogen atoms directly bonded to carbon atoms that are part of the conjugated ring in: ① aniline; ② furfuryl alcohol.

The circled numerals have the following meanings for the respective moieties in Table 1:

$R^1$:

①=—$CH_2$—

②=—$CH_2$—NH—$CH_2$—

W:

①=—H

②=—$CH_2OH$

③=—$CH_2OCH_3$

④=—$CH_2Br$

⑤=—$CH_2N(CH_3)(CH_2CH_2OH)$

⑥=—$CH_2N(CH_2CH_2OH)_2$

⑦=—$CH_2NH_2$

⑧=—$CH_2N^+(CH_3)_3 \cdot OH^-$

Y:

①=—H

②=General formula (II), with each of $R^2$ and $R^3$ representing —$CH_3$ and the "W" moieties of general formula (II) being distributed jointly with the "W" moieties explicitly shown in general formula (I) to give the ratio(s) shown in the cell on the same line under the column heading "W".

Z: A moiety drived by deleting two hydrogen atoms from hydrogen atoms directly bonded to carbon atoms that are part of the conjugated ring in:
① aniline;
② furfuryl alcohol.

In addition to the resins described in Table 1, materials other than water were used in the complete treatment solutions used in the working examples. These materials, and an identifier code for each of them that is used in later tables, were as follows:

b1: Vanadium pentoxide        b2: Ammonium meta-vanadate
b3: Vanadium trioxide         b4: Vanadium oxyacetylacetonate
c1: Zirconium ammonium carbonate    c2: Fluorozirconic acid
c3: Ammonium heptamolybdate   c4: Ammonium metatungstate
c5: Titanium laurate          c6: Manganese carbonate d1: Acrylic emulsion PolySol™ AP6530 manufactured by Showa Highpolymer Co., Ltd.
d2: Acrylic emulsion PolySol™ AM-2386 manufactured by Showa Highpolymer Co., Ltd.
d3: Cation-modified epoxy resin Adekaresin™ EM-440 manufactured by Asahi Denka Kogyo K.K.
d4: Aqueous polyurethane Superflex™ 150 manufactured by Daiichi Kogyo Seiyaku K.K.
d5: Aqueous polyurethane Adekabontaitaa™ HUX-670 manufactured by Asahi Denka Kogyo K.K.)

e1: L-ascorbic acid    e2: D-gluclose    e3: Glyoxal
e4: Aminotri(methylenephosphonic acid)
f1: HF    f2: $H_2ZrF_6$    f3: $H_2TiF_6$    f4: $H_2SIF_6$
g1: Aqueous ammonia    g2: Phosphoric acid The amounts of the materials, other than water, which constituted any otherwise unstated balance, that were used to prepare each specific treatment solution are shown in Table 2 below, the parenthetical numbers in each cell of Table 2 in which such numbers appear indicating parts by mass of the ingredient keyed immediately to the left of the parenthetical number. To prepare each specific treatment solution, an aqueous solution and/or aqueous dispersion in which the vanadium component (b) and organic component (e) were premixed and in which the concentration of (b) in terms of metal content was 5% was agitated for approximately 2 hours at 80 to 100° C., and was then cooled to room temperature. Afterward, under agitation, a separate aqueous solution of the fluorine component (f) and another separate aqueous solution of the metal component (c) were added to the mixture formed by cooling the premixed solutions of vanadium component (b) and organic component (e); then, to the resulting mixture the resin component (a) as described in Table 1 was added, and finally, an aqueous dilution of the organic polymer (d) was added.

TABLE 2

| Examples and Comparative Examples | Substrate | Chemical Nature and Concentrations in the Treatment Solution of Component or Substitute: | | | | | | | Peak Metal Temperature, ° C. |
|---|---|---|---|---|---|---|---|---|---|
| | | (A) | (B) | (C) | (D) | (E) | (F) (g/l) | (G) | |
| | | (Concentrations in Parts by Mass) | | | | | | | |
| Example 1 | 1.1 | a1(50) | b1(3) | c1(6) | d1(40) | e1(1) | f1(1) | None | 80 |
| Example 2 | 1.2 | a1(20) | b2(4) | c3(4) | d4(70) | e2(2) | f2(2) | None | 150 |
| Example 3 | 1.1 | a2(45) | b2(3) b3(1) | c4(3) c5(3) | d1(42) | e4(3) | f4(2) | g1(5) | 80 |
| Example 4 | 1.2 | a2(10) | b3(2) b4(2) | c1(3) c6(8) | d4(76) | e4(5) | f1(3) | None | 150 |
| Example 5 | 1.1 | a1(83) | b1(5) | c1(10) | None | e1(2) | f1(1) | None | 80 |
| Example 6 | 1.1 | a3(40) | b2(4) | c2(4) | d2(52) | None | f3(2) | None | 150 |
| Example 7 | 1.1 | a3(38) | b2(4) | c2(4) | d2(50) | e1(4) | f3(2) | None | 80 |
| Example 8 | 1.3 | a4(20) | b1(2) b4(3) | c3(5) | d5(70) | None | f1(1) | None | 150 |
| Example 9 | 1.1 | a5(70) | b2(5) | c4(5) | d3(20) | e3(1) | f2(2) | g2(25) | 80 |
| Example 10 | 1.1 | a5(70) | b2(5) | c4(5) | d3(20) | e3(1) | None | g2(35) | 80 |
| Example 11 | 1.2 | a6(20) | b2(10) | c5(10) | d5(55) | e4(5) | f4(1) | None | 150 |
| Example 12 | 1.3 | a7(60) | b3(2) b4(3) | c5(5) c5(5) | d3(20) | None | f4(1) | g2(5) | 80 |
| Example 13 | 1.3 | a8(30) | b1(6) | c2(4) | d2(54) | e2(6) | f2(2) | g2(5) | 150 |
| Example 14 | 1.3 | a9(10) | b2(10) | c5(4) | d5(70) | e4(6) | f4(5) | None | 150 |
| Example 15 | 1.1 | a5(20) | b4(0.5) | c2(1) | d5(78.5) | None | None | g2(10) | 80 |
| Example 16 | 1.2 | a5(10) | b4(1) | c2(2) | d5(86) | e1(1) | None | g2(5) | 80 |
| Comparative Example 1 | 1.1 | None | b1(3) | c1(6) | d1(40) | e1(1) | f1(1) | None | 80 |
| Comparative Example 2 | 1.2 | a1(20) | None | c3(4) | d4(70) | e2(2) | f2(2) | None | 150 |
| Comparative Example 3 | 1.1 | a2(45) | b2(3) b3(1) | None | d1(42) | e4(3) | f4(2) | g1(5) | 80 |
| Comparative Example 4 | 1.2 | Phenol(20) | b2(4) | c3(4) | d4(70) | e2(2) | f2(2) | None | 150 |
| Comparative Example 5 | 1.1 | ZINCHROM ® 3360H process as instructed by Nihon Parkerizing Co., Ltd., a prior art type commercially available chromate conversion coating, performed with roll-coating so that the amount of adhering Cr was 0.020 g/m². | | | | | | | 80 |

3. Treatment Methods

3.1 Degreasing

The substrates were degreased with PARCO® Cleaner 364S, an alkaline degreasing agent concentrate manufactured by Nihon Parkerizing Co., Ltd. (20 g/l of the concentrate in the working degreasing liquid, 60° C., 10-second spray, spray pressure: 0.5 kilograms of force per square centimeter); afterward, the samples were spray-washed with water for 10 seconds.

3.2 Application and Drying of Coating

The treatment solution, adjusted to a concentration of 16% by mass of nonvolatile ingredients from components (A) through (E), was applied by means of a bar coater so as to produce a dry film thickness of 1 micrometre, and the applied coating was dried at a peak metal temperature shown in Table 2.

4. Evaluation Methods

4.1 Corrosion Resistance

Each treated plate sample manufactured in the working examples and comparative examples was subjected to a corrosion resistance test using an unworked sample (planar part), a sample cross-cut to the base material by means of an NT cutter (cross-cut part), and a sample subjected to Erichssen 7 mm extrusion working (worked part). For planar parts, the evaluation was based on determining the area of white rust generation following salt spraying for 72 hours in accordance with the salt spray test method of Japanese Industrial Standard (hereinafter usually abbreviated as "JIS") Z-2371. The areas of white rust generation were reported on the following scale: ⊚=less than 10% ○=10% or greater but less than 30%; △=30% or greater but less than 60%; and x=60% or greater. For cross-cut parts, the extent of white rust generation were evaluated visually by the naked eye following salt spraying for 72 hours in accordance with the salt spray test method of JIS-Z-2371 and reported on the following scale: ⊚=almost no rust; ○=slight rust present; △=more than slight rust observed; x=generation of rust conspicuous. Worked parts were treated and evaluated in the same manner and reported using the same scale as for cross-cut parts.

4.2 Alkali Resistance

The treated plate samples were sprayed for 2 minutes at a temperature of 65° C. with an aqueous solution of an alkaline solution prepared by diluting PALKLIN™ Cleaner 364S concentrate for alkaline degreasing to a concentration of 20 g/l. (This cleaner concentrate is manufactured by and commercially available from Nihon Parkerizing Co., Ltd.) The samples were then washed with water and dried at 80° C. The corrosion resistance of these plates was evaluated using the conditions and evaluation methods described in part 4.1 above.

4.3 Fingerprint Resistance

Human fingers were pressed against the surfaces of the treated plates, and the conditions of fingerprint traces were observed and evaluated with the naked eye and are reported on the following scale: ⊚=absolutely no traces of fingerprints, ○=slight traces of fingerprints present, △=more than slight traces of fingerprints present, x=clearly remaining fingerprints.

4.4 Stability of Treatment Agent

The treatment agents used in the working examples and comparative examples were stored in sealed containers for 3 weeks at 30° C.; afterward, the conditions of the liquids were observed and are reported on the following scale: ⊚=absolutely no change; ○=increased viscosity or slight amount of separated matter, but re-dispersion was facile; △=separated matter present, and re-dispersion difficult, x=gelation.

The test evaluation results are shown in Table 3. As is clear from Table 3, Examples 1 through 16 with coating films formed using the surface treatment composition of the present invention show good treatment solution stability and fingerprint resistance; furthermore, since these coating films contain no chromium, they are highly safe. Moreover, the planar parts, cross-cut parts, and worked parts all show a corrosion resistance superior to that obtained using a chromate treatment.

In contrast, Comparative Example 1, which does not contain any resin component (A), an essential component of the treatment agent of the present invention, Comparative Example 2, which does not contain any vanadium component (B), and Comparative Example 3, which does not contain any metal component (C), show an inferior corrosion resistance. Furthermore, Comparative Example 4, which used a material that did not have the specified structure of the present invention instead of the aforementioned resin component (A), also showed an inferior corrosion resistance. Moreover, Comparative Example 5, which was treated with a chromate conversion coating, showed an especially inferior fingerprint resistance and corrosion resistance of worked parts following exposure of the coating to alkali.

The treatment agent of the present invention is a non-chromate type treatment agent which contains no harmful chromium compounds. Coating films formed from this surface treatment composition show a corrosion resistance equal to or better than that of conventional chromate coating films, not only in planar portions, but also in scratched areas and worked parts. Furthermore, these coating films are also superior in terms of alkali resistance and fingerprint resistance. Accordingly, the surface treatment composition, surface treatment method and surface-treated metal material of the present invention have an extremely high utilization value in industrial terms.

TABLE 3

| | Corrosion Resistance of: | | | | | | Finger-print Resistance | Stability of treatment Agent |
|---|---|---|---|---|---|---|---|---|
| | Planner Parts | | Cross-Cut Parts | | Worked Parts | | | |
| | BEtA | AEtA | BEtA | AEtA | BEtA | AEtA | | |
| Example 1 | ⊚ | ⊚ | ⊚ | ⊚ | ⊚ | ⊚ | ⊚ | ⊚ |
| Example 2 | ⊚ | ⊚ | ⊚ | ⊚ | ⊚ | ⊚ | ⊚ | ⊚ |
| Example 3 | ⊚ | ⊚ | ⊚ | ⊚ | ⊚ | ⊚ | ⊚ | ⊚ |
| Example 4 | ⊚ | ⊚ | ⊚ | ⊚ | ⊚ | ⊚ | ⊚ | ⊚ |
| Example 5 | ○ | ○ | ○ | ○ | ○ | ○ | ○ | ○ |
| Example 6 | ○ | ○ | ○ | ○ | ○ | ○ | ⊚ | ○-△ |
| Example 7 | ⊚ | ⊚ | ⊚ | ⊚ | ⊚ | ⊚ | ⊚ | ⊚ |
| Example 8 | ⊚ | ⊚ | ○ | ○ | ○ | ○ | ⊚ | ○-△ |
| Example 9 | ⊚ | ⊚ | ⊚ | ⊚ | ⊚ | ⊚ | ⊚ | ⊚ |
| Example 10 | ○ | ○ | ○ | ○ | ○ | ○ | ⊚ | ⊚ |
| Example 11 | ⊚ | ⊚ | ⊚ | ⊚ | ⊚ | ⊚ | ⊚ | ⊚ |
| Example 12 | ○ | ○ | ○ | ○ | ○ | ○ | ⊚ | ○-△ |
| Example 13 | ⊚ | ⊚ | ⊚ | ⊚ | ⊚ | ⊚ | ⊚ | ⊚ |
| Example 14 | ⊚ | ⊚ | ⊚ | ⊚ | ⊚ | ⊚ | ⊚ | ⊚ |
| Example 15 | ⊚ | ⊚ | ⊚ | ⊚ | ⊚ | ⊚ | ⊚ | ○ |
| Example 16 | ⊚ | ⊚ | ⊚ | ⊚ | ⊚ | ⊚ | ⊚ | ⊚ |
| Comparative Example 1 | △ | x | x | x | x | x | ⊚ | ⊚ |
| Comparative Example 2 | △ | △ | △ | x | △ | x | ⊚ | ⊚ |
| Comparative Example 3 | ○ | x | ○ | x | ○ | x | ⊚ | ⊚ |
| Comparative Example 4 | △ | x | x | x | x | x | ⊚ | ⊚ |

TABLE 3-continued

|  | Corrosion Resistance of: | | | | | | Finger-print Resistance | Stability of treatment Agent |
|---|---|---|---|---|---|---|---|---|
|  | Planner Parts | | Cross-Cut Parts | | Worked Parts | | | |
|  | BEtA | AEtA | BEtA | AEtA | BEtA | AEtA | | |
| Comparative Example 5 | ○ | Δ | ⊚ | Δ | Δ | X | X | ⊚ |

ABBREVIATIONS FOR TABLE 3
"BEtA" means "Before Exposure of the Coated Substrate to Alkali" and
"AEtA" means "After Exposure of the Coated Substrate to Alkali".

What is claimed is:

1. A metal surface treatment liquid composition that comprises water and the following components:
(A) a component of resin molecules that conform to general formula (I):

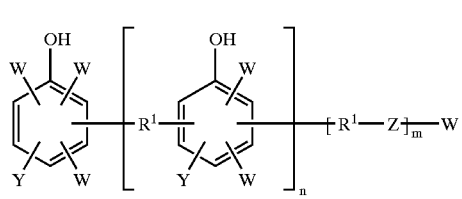

(I)

wherein:
n represents 0 or an integer from 1 through 29;
m represents 0 or an integer from 1 through 10;
W represents a moiety selected from the group consisting of:
(1) a hydrogen atom moiety; and
(2) moieties conforming to one of the general formulas $-CH_2X$, $-CH_2NHCH_2X$, and $-CH=NCH_2X$, in all of which "X" represents a moiety selected from the group consisting of:
—OH;
moieties conforming to $-OR^4$, wherein $R^4$ is selected from the group consisting of alkyl moieties having from 1 to 5 carbon atoms and hydroxyalkyl moieties having from 1 to 5 carbon atoms;
covalently bonded halogen atom moieties; and
moieties conforming to one of general formula (III) or general formula (IV):

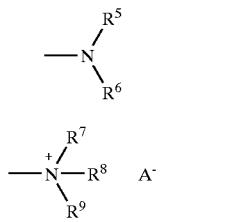

wherein:
each of $R^5$, $R^6$, $R^7$, $R^8$, and $R^9$ independently represents a moiety selected from the group consisting of:
hydrogen atom moieties;
alkyl moieties having from 1 to 10 carbon atoms; and
hydroxyalkyl moieties having from 1 to 10 carbon atoms; and
$A^-$ represents a hydroxyl ion or an anion of an acid;
each "W" symbol in general formula (I) is independently selected, subject to constraints that:
a positive number of the selections for "W" are not hydrogen atom moieties; and
said positive number of the selections for "W" that are not hydrogen atom moieties has a ratio to the number n+m+1, this ratio being denoted hereinafter as the "P-ratio", that is from 0.2:1.00 to 4.0:1.00;
$R^1$, independently for each aromatic-ring-containing moiety in the part of formula (I) between the square brackets subscripted by "n" and independently for each $R^1$-Z containing moiety in the part of formula (I) between the square brackets subscripted by "m", represents a moiety selected from the group consisting of $-CH_2-$, $-CH_2-NH-CH_2-$, and $-CH=N-CH_2-$;
Y, independently for each instance of Y in the general formula and independently for each aromatic-ring-containing moiety in the part of formula (I) between the square brackets subscripted by "n", represents a hydrogen moiety or a moiety that conforms to general formula (II):

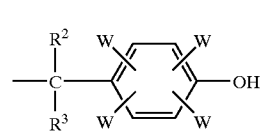

(II)

wherein each of $R^2$ and $R^3$ independently represents a hydrogen atom or an alkyl group with not more than 3 carbon atoms and W, independently for each instance of its occurrence in formula (II), is selected from the group consisting of:
(1) a hydrogen atom moiety; and
(2) moieties conforming to one of the general formulas $-CH_2X$, $-CH_2NHCH_2X$, and $-CH=NCH_2X$, in all of which "X" represents a moiety selected from the group consisting of:
—OH;
moieties conforming to $-OR^4$, wherein $R^4$ is selected from the group consisting at alkyl moieties having from 1 to 5 carbon atoms and hydroxyalkyl moieties having from 1 to 5 carbon atoms;
covelently bonded halogen atom moieties; and
moieties conforming to one of general formula (III) or general formula (IV):

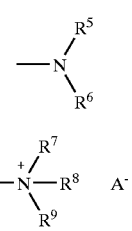

wherein:
each of $R^5$, $R^6$, $R^7$, $R^8$, and $R^9$ independently represents a moiety selected from the group consisting of:

hydrogen atom moieties;
alkyl moieties having from 1 to 10 carbon atoms; and
hydroxyalkyl moieties having from 1 to 10 carbon atoms; and
$A^-$ represents a hydroxyl ion or an anion of an acid;

Z as selected from the group consisting of
(1) divalent moieties which:
are formed by the loss, from an organic compound that is reactive with formaldehyde in an addition condensation reaction and that contains at least one 5- or 6-membered ring that includes two conjugated double bonds, of two hydrogen atoms, each originally bonded to a carbon atom that was part of said 5- or 6-membered ring; and
differ from the aromatic-ring-containing moiety in the part of formula (I) between the square brackets subscripted by "n"; and
(2) divalent moieties formed by the loss of one hydrogen atom from each of two distinct amino moieties of melamine, guanamine, and urea; and (B) a component selected from the group consisting of vanadium compounds in which the valence of the vanadium atoms is 5, 4, or 3; and (C) a component selected from the group consisting of compounds that contain at least one metal selected from the group consisting of zirconium, titanium, molybdenum, tungsten, manganese, and cerium.

2. A metal surface treatment composition according to claim 1, in which at least some of the vanadium component (B) consists of a vanadium compound in which the vanadium valence is 3 or 4.

3. A metal surface treatment composition as claimed in claim 2, which additionally comprises a component (D) that is selected from the group consisting of organic polymers that:
do not conform to general formula (I);
have a weight average molecular weight that is from 1,000 to 1,000,000; and
are dispersed or dissolved in the metal treatment composition.

4. A metal surface treatment composition as claimed in claim 3, additionally comprising a component (E) selected from the group consisting of water-soluble organic compounds that are not part of any of components (A) through (D) and contain in each molecule at least one moiety selected from the group consisting of hydroxy moieties, carbonyl moieties, carboxyl moieties, phosphoric acid moieties, phosphonic acid moieties, primary, secondary, and tertiary amino moieties and amido moieties.

5. A metal surface treatment composition as claimed in claim 4, additionally comprising a component (F) that is selected from the group consisting of water soluble fluorides and complex fluorides.

6. A metal surface treatment composition according to claim 5, wherein:
component (A) comprises a solids part, component (D) comprises a solids part, and the sum of the masses of: the solids part of component (A); the vanadium content of component (B); the metals zirconium, titanium, molybdenum, tungsten, manganese, and cerium contained in component (C); the solids part of component (D); and component (E) in the composition is defined to total 100 mass parts;
the mass of the solids part of component (A) is from 5 to 95 parts of said 100 mass parts;
the mass of the vanadium content of component (B) is from 0.1 to 20 parts of said 100 mass parts;
the mass of the metals zirconium, titanium, molybdenum, tungsten, manganese, and cerium contained in component (C) is from 0.1 to 20 parts of said 100 mass parts;
the mass of the solids part of component (D) is from 10 to 90 parts of said 100 mass parts;
the mass of component (E) is from 10 to 300% of the mass of the vanadium content of component (B); and
the concentration of component (F) is from 0.1 to 20 g/l.

7. A metal surface treatment composition according to claim 4, wherein:
component (A) comprises a solids part, component (D) comprises a solids part, and the sum of the masses of: the solids part of component (A); the vanadium content of component (B); the metals zirconium, titanium, molybdenum, tungsten, manganese, and cerium contained in component (C); the solids part of component (D); and component (E) in the composition is defined to total 100 mass parts;
the mass of the solids part of component (A) is from 5 to 95 parts of said 100 mass parts;
the mass of the vanadium content of component (B) is from 0.1 to 20 parts of the 100 parts of the total of masses of said 100 mass parts;
the mass of the metals zirconium, titanium, molybdenum, tungsten, manganese, and cerium contained in component (C) is from 0.1 to 20 parts of said 100 mass parts;
the mass of the solids part of component (D) is from 10 to 90 parts of said 100 mass parts; and
the mass of component (E) is from 10 to 300% of the mass of the vanadium content of component (B).

8. A metal surface treatment composition according to claim 3, wherein:
component (A) comprises a solids part, component (D) comprises a solids part, and the composition optionally comprises a component (E) selected from the group consisting of water-soluble organic compounds that are not part of any of components (A) through (D) and contain in each molecule at least one moiety selected from the group consisting of hydroxy moieties, carbonyl moieties, carboxyl moieties, phosphoric acid moieties, phosphonic acid moieties, primary, secondary, and tertiary amino moieties, and amido moieties;
the sum of the masses of: the solids part of component (A); the vanadium content of component (B); the metals zirconium, titanium, molybdenum, tungsten, manganese, and cerium contained in component (C); the solids part of component (D); and of optional component (E) is defined to total 100 mass parts;
the mass of the solids part of component (A) is from 5 to 95 parts of said 100 mass parts;
the mass of the vanadium content of component (B) is from 0.1 to 20 parts of the 100 parts of the total of masses of said 100 mass parts;
the mass of the metals zirconium, titanium, molybdenum, tungsten, manganese, and cerium contained in component (C) is from 0.1 to 20 parts of said 100 mass parts; and
the mass of the solids part of component (D) is from 10 to 90 parts of said 100 mass parts.

9. A metal surface treatment composition according to claim 1, wherein:
component (A) comprises a solids part,
the composition optionally comprises:
  a component (D) comprising a solids part and being selected from the group consisting of organic polymers that do not conform to general formula (I) and have a weight average molecular weight that is from 1,000 to 1,000,000 and/or
  a component (E) comprising a solids part and being selected from the group consisting of water-soluble organic compounds that are not part of any of components (A) through (D) and contain in each molecule at least one moiety selected from the group consisting of hydroxy moieties, carbonyl moieties, carboxyl moieties, phosphoric acid moieties, phosphonic acid moieties, primary, secondary, and tertiary amino moieties, and amido moieties;
the sum of the masses of: the solids part of component (A); the vanadium content of component (B); the metals zirconium, titanium, molybdenum, tungsten, manganese, and cerium contained in component (C); and the solids part of optional components D and E is defined to total 100 mass parts;
  the mass of the solids part of component (A) is from 5 to 95 parts of said 100 mass parts;
  the mass of the vanadium content of component (B) is from 0.1 to 20 parts of said 100 mass parts; and
  the mass of the metals zirconium, titanium, molybdenum, tungsten, manganese, and cerium contained in component (C) is from 0.1 to 20 parts of said 100 mass parts.

10. A metal surface treatment composition as claimed in claim 2, additionally comprising a component (E) selected from the group consisting of water-soluble organic compounds that:
  are not part of any of components (A) through (C);
  are not organic polymers that:
    do not conform to general formula (I);
    have a weight average molecular weight that is from 1,000 to 1,000,000; and
    are dispersed or dissolved in the metal treatment composition; and
  contain in each molecule at least one moiety selected from the group consisting of hydroxy moieties, carbonyl moieties, carboxyl moieties, phosphoric acid moieties, phosphonic acid moieties, primary, secondary, and tertiary amino moieties, and amido moieties.

11. A metal surface treatment composition as claimed in claim 10, additionally comprising a component (F) that is selected from the group consisting of water soluble fluorides and complex fluorides.

12. A metal surface treatment composition according to claim 11, wherein:
component (A) comprises a solids part,
the composition optionally comprises a component (D) comprising a solids part and being selected from the group consisting of organic polymers that do not conform to general formula (I) and have a weight average molecular weight that is from 1,000 to 1,000,000
the sum of the masses of: the solids part of component (A); the vanadium content of component (B); the metals zirconium, titanium, molybdenum, tungsten, manganese, and cerium contained in component (C); the solids part of optional component D and of component (E) is defined to total 100 mass parts;
  the mass of the solids part of component (A) is from 5 to 95 parts of said 100 mass parts;
  the mass of the vanadium content of component (B) is from 0.1 to 20 parts of said 100 mass parts;
  the mass of the metals zirconium, titanium, molybdenum, tungsten, manganese, and cerium contained in component (C) is from 0.1 to 20 parts of said 100 mass parts;
  the mass of component (E) is from 10 to 300% of the mass of the vanadium content of component (B); and
  the concentration of component (F) is from 0.1 to 20 g/l.

13. A metal surface treatment composition according to claim 10, wherein:
component (A) comprises a solid part,
the composition optionally comprises a component (D) comprising a solids part and being selected from the group consisting of organic polymers that do not conform to general formula (I) and have a weight average molecular weight that is from 1,000 to 1,000,000
the sum of the masses of: the solids part of component (A); the vanadium content of component (B); the metals zirconium, titanium, molybdenum, tungsten, manganese, and cerium contained in component (C); the solids part of optional component D and of component (E) is defined to total 100 mass parts;
  the mass of the solids part of component (A) is from 5 to 95 parts of said 100 mass parts;
  the mass of the vanadium content of component (B) is from 0.1 to 20 parts of the 100 parts of the total of masses of said 100 mass parts;
  the mass of the metals zirconium, titanium, molybdenum, tungsten, manganese, and cerium contained in component (C) is from 0.1 to 20 parts of said 100 mass parts; and
  the mass of component (E) is from 10 to 300% of the mass of the vanadium content of component (B).

14. A metal surface treatment composition as claimed in claim 3, additionally comprising a component (F) that is selected from the group consisting of water soluble fluorides and complex fluorides.

15. A metal surface treatment composition according to claim 9, wherein:
  the mass of the solids part of component (A) is from 7 to 85 parts of said 100 mass parts;
  the mass of the vanadium content of component (B) is from 0.5 to 14 parts of said 100 mass parts; and
  the mass of the metals zirconium, titanium, molybdenum, tungsten, manganese, and cerium contained in component (C) is from 0.5 to 15 parts of said 100 mass parts.

16. A process for treating a metallic surface, in which the metallic surface is brought into contact for at least one time interval with a liquid surface treatment composition according to claim 1 so as to form a coating of said liquid composition over said metallic surface and said coating of said liquid composition is dried into place over and adhering to said metallic surface.

17. A process according to claim 16, wherein said metallic surface has a peak temperature from 50 to 250° C. during said process.

18. An article of manufacture comprising an underlying metallic surface coated in a process according to claim 17.

19. An article of manufacture comprising an underlying metallic surface coated in a process according to claim 16.

* * * * *

UNITED STATES PATENT AND TRADEMARK OFFICE
CERTIFICATE OF CORRECTION

PATENT NO.    : 6,736,908 B2                                      Page 1 of 1
DATED         : May 18, 2004
INVENTOR(S)   : Sako et al.

It is certified that error appears in the above-identified patent and that said Letters Patent is hereby corrected as shown below:

Column 20,
Line 46, delete "at" and insert -- of --.
Line 50, delete "covelently" and insert -- covalently --.

Column 21,
Line 8, delete "as" and insert -- is --.

Column 22,
Line 23, delete "5to" and insert -- 5 to --.

Signed and Sealed this

Ninth Day of May, 2006

JON W. DUDAS
*Director of the United States Patent and Trademark Office*